J. KLINE.
Constructing Osage-Orange Hedge.

No. 207,041. Patented Aug. 13, 1878.

Witnesses:
Fred G. Dietrich.
Edward F. Schmidt.

Inventor:
John Kline,
by Louis Bagger & Co.
his Attorneys.

UNITED STATES PATENT OFFICE.

JOHN KLINE, OF DAYTON, OHIO.

IMPROVEMENT IN CONSTRUCTING OSAGE-ORANGE HEDGES.

Specification forming part of Letters Patent No. 207,041, dated August 13, 1878; application filed June 5, 1878.

*To all whom it may concern:*

Be it known that I, JOHN KLINE, of Dayton, in the county of Montgomery and State of Ohio, have invented certain new and useful Improvements in Constructing Osage-Orange Hedges; and I do hereby declare that the following is a full, clear, and exact description of the invention, which will enable others skilled in the art to which it appertains to make and use the same, reference being had to the accompanying drawings, which form a part of this specification.

This invention relates to so-called "live" hedges or fences; and it consists in a certain method of braiding young osage-orange plants, by which, in a few years after transplanting, a solid and substantial hedge or fence is made, which will effectually ward off cattle and trespassers, substantially as hereinafter more fully described, and pointed out in the claim.

Figure 1:
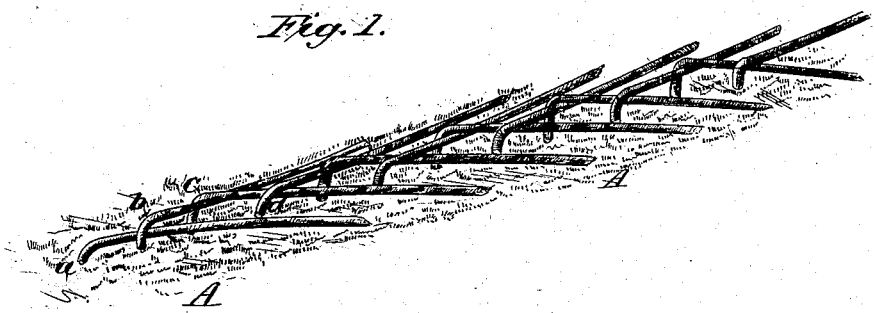
Figure 2:
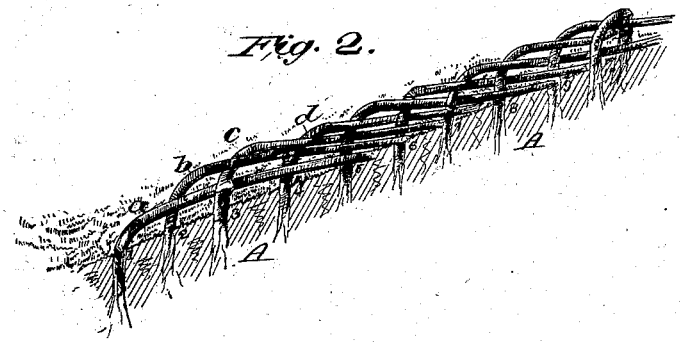

In the drawing, in Figures 1 and 2, (both of which represent perspective views of a section of osage-orange hedge braided or built up according to my invention,) A is the soil, into which the young plants are planted, about six inches apart, in a straight row.

I have found that young plants of two years' growth, after transplanting, are best adapted for the braiding process, which may be made either single or double, the single process being represented in Fig. 1, and the double in Fig. 2.

Starting from one end of the row of plants, the first one (indicated by the letter *a*) is brought down against the ground to the left of the plant next to it, (marked *b*,) and to the right of the third plant in the row, marked *c*.) Next plant *b* is turned down in like manner, but to the right of plant *c*, and to the left of the next plant, *d*. Plant *c* is twisted in like manner as plant *a*, where the start was made, plant *d* in like manner as *b*, and so on through the entire row, as shown in the drawing.

The double-braiding process (represented in Fig. 2) is substantially the same, except that the end of each plant, after being bent around the two plants next to it in the manner described, is twisted once more and brought back of or around the third plant or shoot from it. This will readily be understood by reference to Fig. 2, from which it will be seen that plant *a* is first turned to the right of the plant next to it, *b*, then to the left of *c*, and finally again twisted and inserted to the right of *d*, and so on through all the plants in the row, forming a double braid or loop.

In either case, after transplanting, the plants should be trimmed to a single switch, and pressed close to the ground in the process of braiding. To facilitate this operation a spade may be used, which is inserted in front of each plant in its turn, so as to press the soil away from the plant and permit this to be bent down close to the ground.

I claim and desire to secure by Letters Patent of the United States—

An improved hedge or fence, consisting of a series of the osage-orange plants, with their stems *a b c d* trimmed to switches and interwoven or intertwined with each other, substantially as shown and described, for the purpose set forth.

In testimony that I claim the foregoing as my own I have hereunto affixed my signature in presence of two witnesses.

JOHN KLINE.

Witnesses:
  C. L. BAUMANN,
  THEODORE MENCHE.